(12) United States Patent
Sawahata et al.

(10) Patent No.: US 10,525,806 B2
(45) Date of Patent: Jan. 7, 2020

(54) ROOF STRUCTURE OF AUTOMOTIVE VEHICLE

(71) Applicant: Webasto Japan Co., Ltd., Hiroshima (JP)

(72) Inventors: Koji Sawahata, Higashihiroshima (JP); Yasufumi Kawakami, Higashihiroshima (JP)

(73) Assignee: Webasto Japan Co., Ltd., Hiroshima (JP)

( * ) Notice: Subject to any disclaimer, the term of this patent is extended or adjusted under 35 U.S.C. 154(b) by 0 days.

(21) Appl. No.: 16/047,843

(22) Filed: Jul. 27, 2018

(65) Prior Publication Data

US 2018/0334019 A1   Nov. 22, 2018

Related U.S. Application Data

(63) Continuation of application No. 15/459,235, filed on Mar. 15, 2017, now Pat. No. 10,183,561.

(30) Foreign Application Priority Data

Mar. 18, 2016   (JP) ................................. 2016-054753

(51) Int. Cl.
*B60J 7/14* (2006.01)
*B60J 1/18* (2006.01)
*B60J 7/185* (2006.01)

(52) U.S. Cl.
CPC ............. *B60J 7/145* (2013.01); *B60J 1/1823* (2013.01); *B60J 7/1851* (2013.01)

(58) Field of Classification Search
CPC ......... B60J 7/145; B60J 1/1823; B60J 7/1851
USPC ...................................................... 296/107.07
See application file for complete search history.

(56) References Cited

U.S. PATENT DOCUMENTS

2008/0061584 A1   3/2008   Hermann et al.
2010/0283286 A1   11/2010   Odoi et al.

*Primary Examiner* — Joseph D. Pape
(74) *Attorney, Agent, or Firm* — Studebaker & Brackett PC

(57) ABSTRACT

There are provided a front roof, a rear roof, a glass unit including a rear-window glass, a rear roof support link which openably supports the rear roof at a vehicle body, a front-roof support link mechanism which openably supports the front roof, the front-roof support link mechanism being connected to the rear roof support link such that closed states of both the front roof and the rear roof are achieved by means of the rear roof support link and the front-roof support link mechanism, and a glass-unit support link mechanism which is connected to the rear roof support link and configured to support the glass unit in a closed position.

3 Claims, 12 Drawing Sheets

ROOF STRUCTURE OF AUTOMOTIVE VEHICLE

CROSS-REFERENCE TO RELATED APPLICATIONS

This application is a Continuation Application of U.S. patent application Ser. No. 15/459,235 filed on Mar. 15, 2017 which claims benefit of priority to Japanese Patent Application No. 2016-054753 filed on Mar. 18, 2016, the entire contents of each are incorporated herein by reference.

BACKGROUND OF THE INVENTION

The present invention relates to a roof structure of an automotive vehicle which comprises a front roof, a rear roof, and a glass unit including a rear-window glass.

Conventionally, a structure disclosed in US Patent Application Publication No. 2010/0283286 A1 is known as the above-described roof structure of the automotive vehicle. That is, this is the roof structure of the automotive vehicle comprising roof members including a front roof and a back roof equipped with a rear roof and a rear-window glass and a link mechanism configured to change a position of the roof members between its use position (a roof closed positon) and its storing position (a roof open position), wherein the back roof is pivotally connected to the front roof and a vehicle-body side member, respectively, so as to serve as a first link of a four-joint link which comprises first and second links.

In the conventional structure of the above-described patent document, since the front roof, the rear roof, and the rear-window glass can be closed concurrently, the rear-window glass does not become unstable, and therefore there is no problem with the conventional structure in particular.

Meanwhile, a structure in which the glass unit including the rear-window glass and the rear roof are liked with each other by a link and the front roof is connected to the rear roof via a link mechanism may be considered. In this case, the glass unit is needed to have a substantially-fixed state when the front roof is closed. Therefore, if it does not have the substantially-fixed state when the front roof is closed, the glass unit may become unstable, so that the front roof may be unstable because of a load of the glass unit.

Accordingly, in the structure in which the glass unit including the rear-window glass and the rear roof are liked with each other by the link and the front roof is connected to the rear roof via the link mechanism, it may be difficult that layout flexibility and link-design flexibility are compatibly attained.

SUMMARY OF THE INVENTION

An object of the present invention is to provide a roof structure of an automotive vehicle comprising the front roof, the rear roof, and the glass unit including the rear-window glass which can easily stabilize respective closed states of the front and rear roofs and the glass unit and also integrally move the front and rear roofs and the glass unit by means of the link and the link mechanism.

The present invention is a roof structure of an automotive vehicle, comprising a front roof, a rear roof, and a glass unit including a rear-window glass which are configured to openably cover part of an upward side of a cabin, respectively, a rear roof support link openably supporting the rear roof at a vehicle body, a front-roof support link mechanism openably supporting the front roof, the front-roof support link mechanism being connected to the rear roof support link such that closed states of both the front roof and the rear roof are achieved by means of the rear roof support link and the front-roof support link mechanism, and a glass-unit support link mechanism connected to the rear roof support link and configured to support the glass unit in a closed position.

According to the present invention, since the closed states of the front roof and the rear roof are achieved by means of the rear roof support link and the front-roof support link mechanism in the structure in which the roofs are opened or closed by concurrently moving three members of the front roof, the rear roof, and the glass unit, the respective closed states of the front roof and the rear roof can be stabilized and also the three members of the front roof, the rear roof, and the glass unit can be moved integrally by means of the rear roof support link, the front-roof support link mechanism, and the glass-unit support link mechanism.

In an embodiment of the present invention, a deck cover configured to openably cover part of the upward side of the cabin and having an opening for the glass unit is provided in back of the rear roof, being spaced apart from the rear roof, the deck cover being openable to a non-interference position where the deck cover has no interference with the front roof or the rear roof while the front roof or the rear roof are opened or closed, and the glass-unit support link mechanism is configured to close the above-described opening of the deck cover with the glass unit when the front roof and the rear roof are closed and the deck cover covers the part of the upward side of the cabin.

a deck cover where an opening for the glass unit is formed is provided in back of the rear roof, being spaced apart from the rear roof, the deck cover being openable to a non-interference position where the deck cover has no interference with the front roof or the rear roof while the front roof or the rear roof are opened or closed, and the glass-unit support link mechanism is configured to close the opening formed at the deck cover with the glass unit when the front roof and the rear roof are closed.

According to this embodiment, while the glass unit may be unstable at a moment right before the front roof and the rear roof have been closed because the glass unit is spaced rearward apart from a rear portion of the rear roof, the above-described opening is closed by the glass unit when the front roof and the rear roof are closed, thereby providing the stable state. Accordingly, this embodiment becomes effective, in particular, in a case where it is necessary that the front roof is moved forward to a position where the front roof is completely closed when a hook provided at a front end of the front roof engages with a latch provided at a vehicle-body side (see a front header) or the like, for example.

In another embodiment of the present invention, the front-roof support link mechanism comprises an intermediate rotational link, and a connecting link which connects the intermediate rotational link and the glass-unit support link mechanism is provided, the connecting link being configured such that a component force is applied in a direction substantially perpendicular to a rotational direction of the intermediate rotational link.

According to this embodiment, since any undesired rotation of the intermediate rotational link is suppressed by the load of the glass unit which is inputted to the intermediate rotational link by way of the glass-unit support link mechanism and the connecting link because of the connection structure of the connecting link to the intermediate rotational link, the glass unit can be moved by using movement of the front-roof support link mechanism, suppressing any improper load influence from the glass unit.

In another embodiment of the present invention, the glass-unit support link mechanism is supported at an upper-side rear portion of the rear roof support link in a hanging manner.

According to this embodiment, the glass-unit load influence on the front-roof support link mechanism is so reduced that the opening/closing movement of the front roof can be stabilized.

Other features, aspects, and advantages of the present invention will become apparent from the following description which refers to the accompanying drawings.

DETAILED DESCRIPTION OF THE INVENTION

Figure 1:
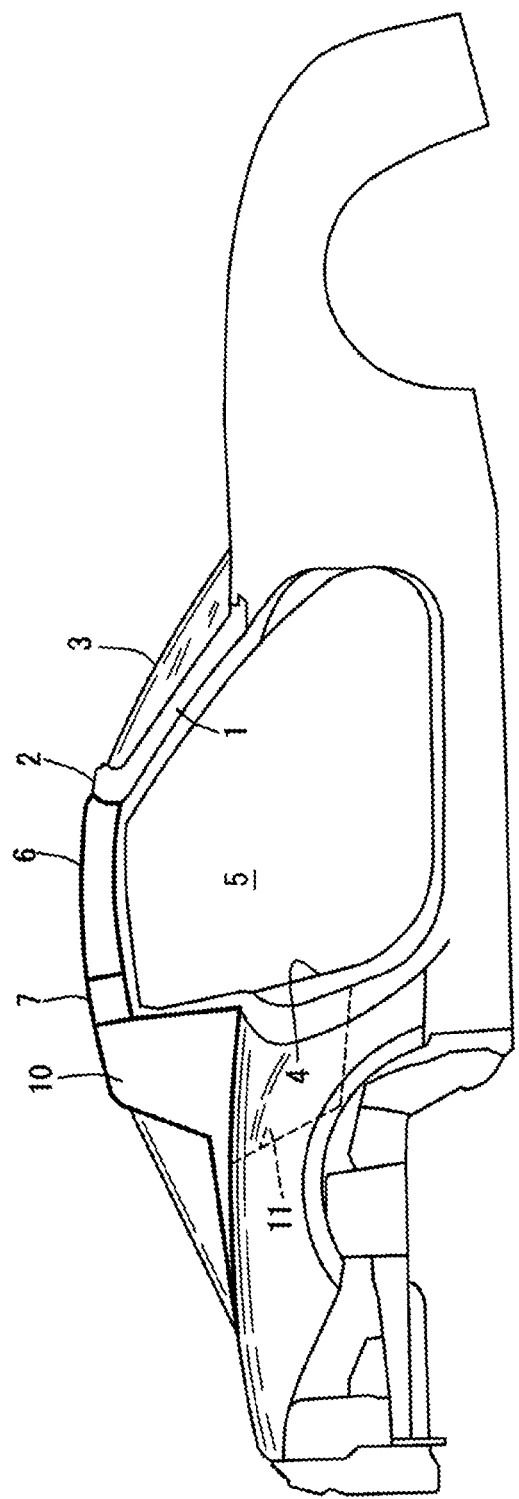
FIG. 1 is a side view of an automotive vehicle equipped with a roof structure of the present invention.

An embodiment of the present invention will be described specifically referring to the drawings. The drawings show a roof structure of an automotive vehicle, and FIG. 1 is a side view of an automotive vehicle comprising the roof structure of the automotive vehicle. In FIG. 1, a pair of right-and-left front pillars 1, 1 (herein, the right-side front pillar is illustrated only in the figures) are provided, and a front header 2 which interconnects respective upper end portions of the pair of right-and-left front pillars 1, 1 is provided.

A front-window glass 3 is attached to a portion enclosed by the above-described pair of right-and-left front pillars 1, 1 and the front header 2. A cabin 5 is provided in back of a front pillar 1 to be continuous to right-and-left door opening portions 4 for passenger's ingress/egress (a right-side door opening portion is illustrated only in the figures), an upward side of the cabin 5 is openably covered with a front roof 6, a rear roof 7, a glass unit 9 including a rear-window glass 8, and a deck cover 10 including an opening (see a portion denoted by reference character 10a shown in FIG. 3). Further, a roof storing portion 11 where the front roof 6, the rear roof 7, and the glass unit 9 are stored is provided behind the cabin 5 at a vehicle-body side.

Figure 2:
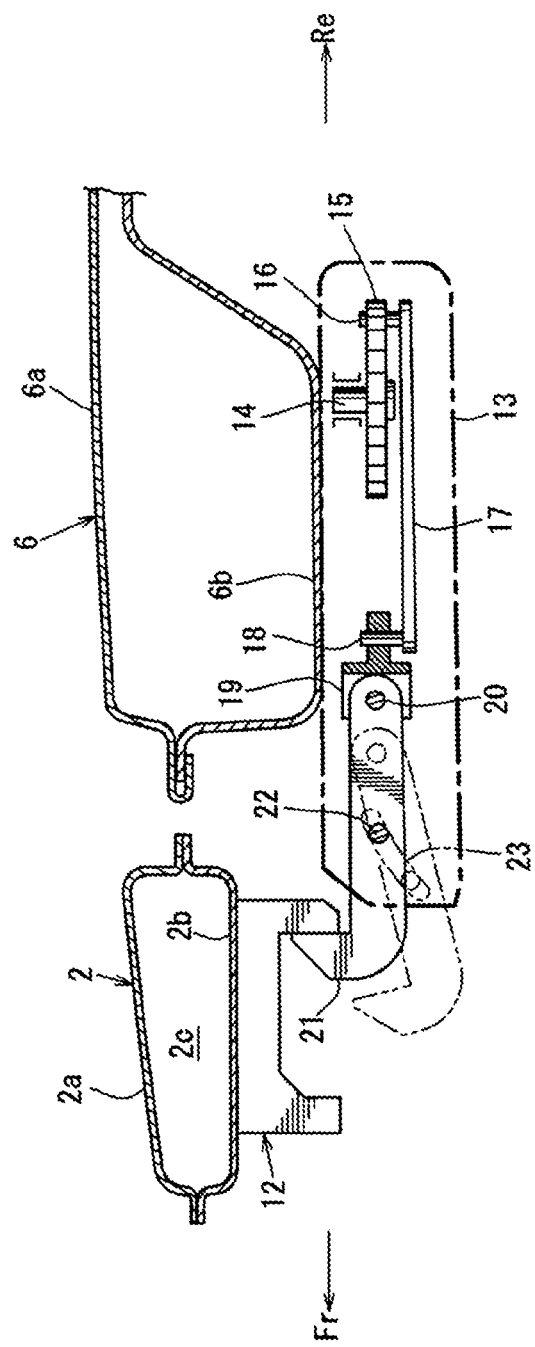
FIG. 2 is a side view showing a lock structure of a roof.

FIG. 2 is a side view schematically showing a lock structure of the roof (specifically, the front roof 6) for the front header 2. The front header 2 comprises a header outer panel 2a and a header inner panel 2b which are fixedly joined together and has a header closed-cross section 2c which extends in a vehicle width direction. A downward-recess shaped latch 12 is attached to a lower portion of the header inner panel 2b. Further, the front roof 6 comprises a roof upper panel 6a and a roof inner panel 6b which are formed integrally through hemming processing, and a lock device unit 13 is attached to a lower portion of the roof inner panel 6b.

The lock device unit 13 comprises a working gear 15 which engages with a gear shaft 14 forwardly/reversely driven by a motor, not illustrated, a crank 17 which is attached to the working gear 15 via a pin 16, a connecting member 19 which is attached to a front end portion of the crank 17 via a pin 18, a hook 21 which is connected to the connecting member 19 via a pin 20, and a guide groove 23 which guides a guide pin 22 provided to protrude at the hook 21.

When the front roof 6 is closed, the crank 17 moves forward, the guide pin 22 lowers along the guide groove 23, a front portion of the hook 21 is moved downward as shown by an imaginary line (two-dotted broken line) in FIG. 2, and then the crank 17 moves rearward, so that the guide pin 22 is elevated along the guide groove 23 and makes a front portion of the hook 21 hook the latch 12 as shown by a solid line in FIG. 2. Thereby, the front roof 6 is locked with the front header 2 of a vehicle-body side member.

Figure 3:
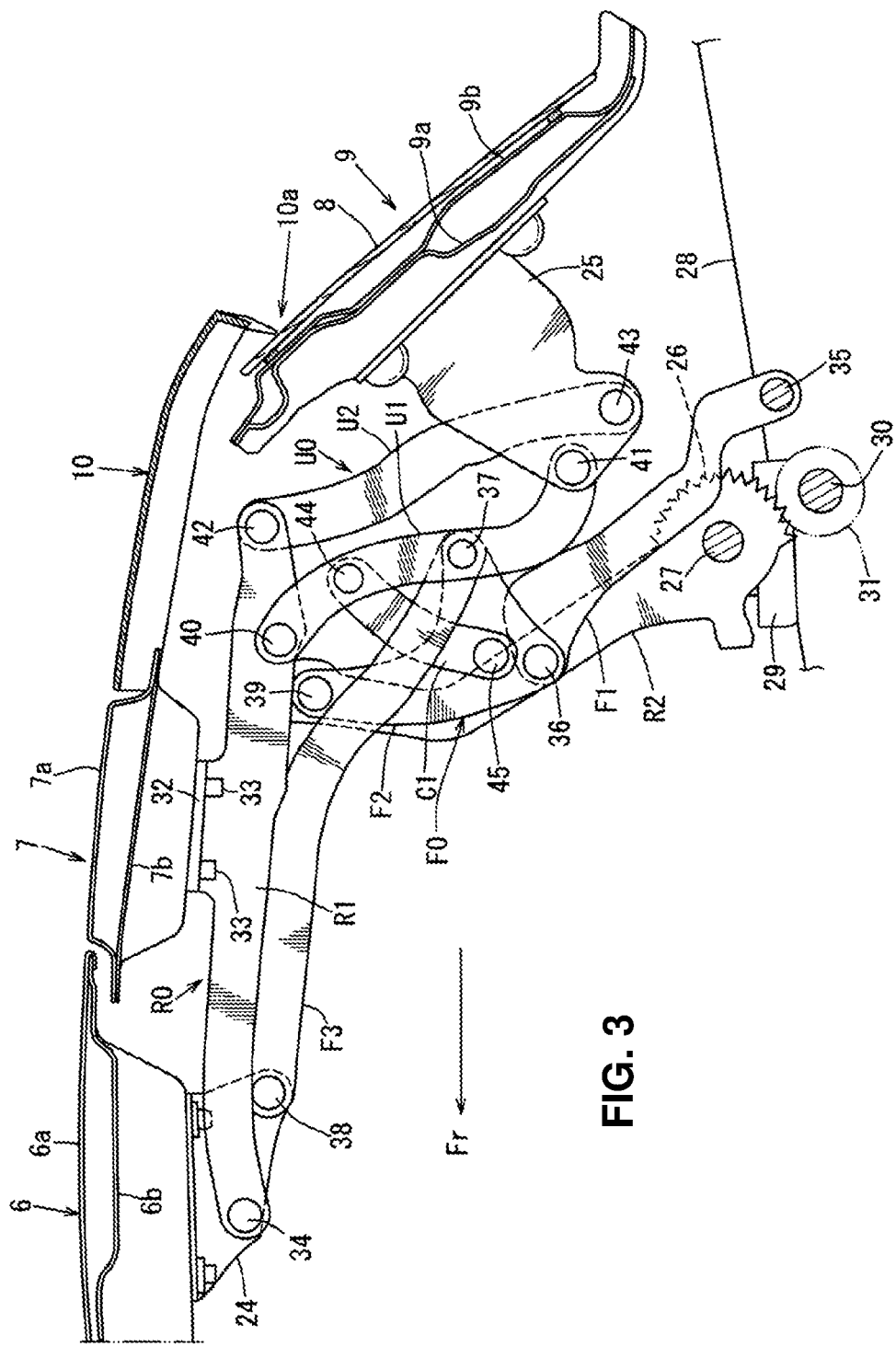
FIG. 3 is a side view of the roof structure of the automotive vehicle, when viewed from an inward side, in a vehicle width direction, of the vehicle.
Figure 4:
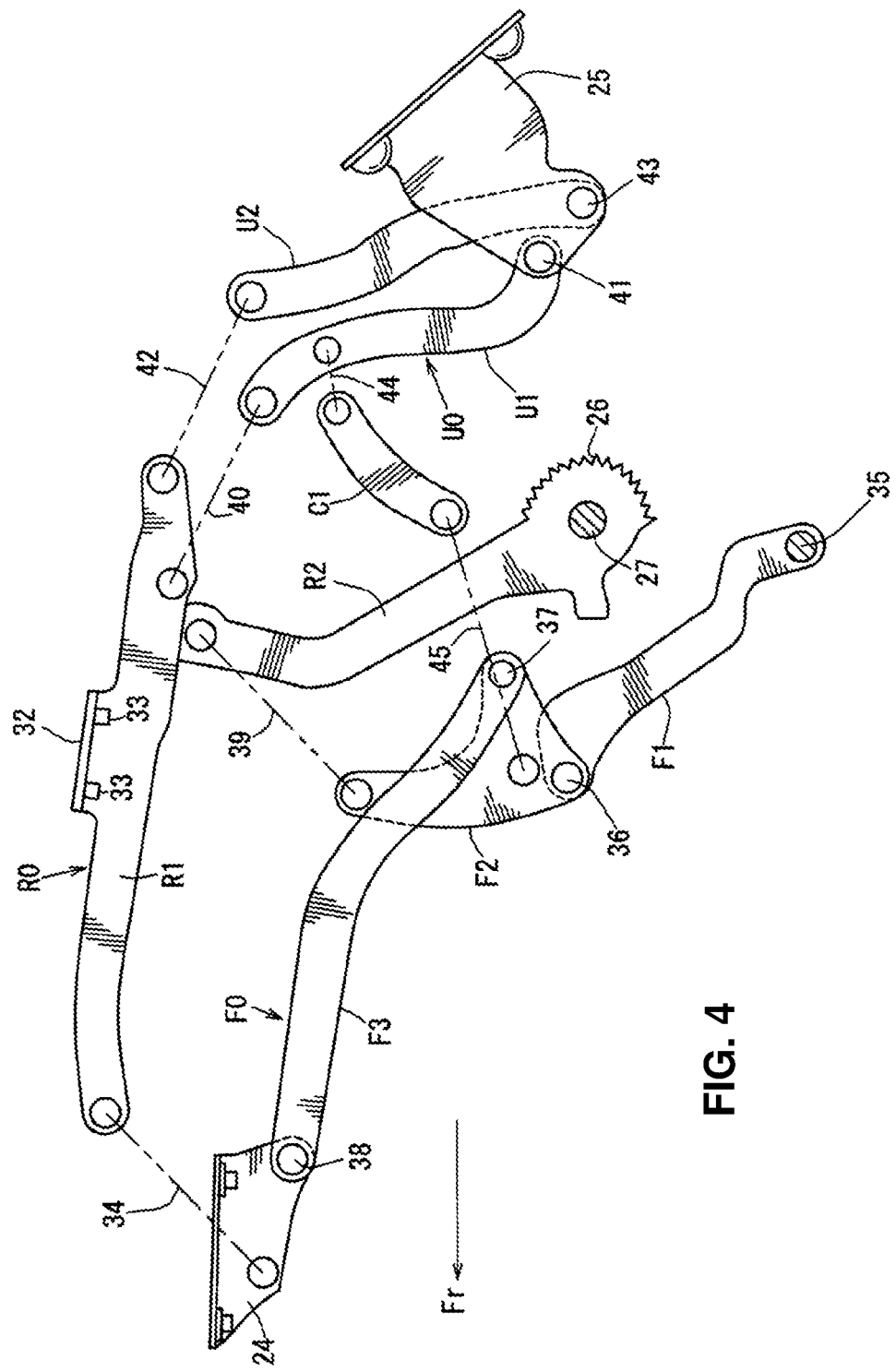
FIG. 4 is an exploded side view of a major part of FIG. 3.

FIG. 3 is a side view of the roof structure of the automotive vehicle, when viewed from an inward side, in the vehicle width direction, of the vehicle, and FIG. 4 is an exploded side view of a major part of FIG. 3. As shown in FIG. 3, a front-roof support bracket 24 (hereafter, referred to as the bracket 24 simply) is attached to a lower portion of the roof inner panel 6b of the front roof 6. Further, the above-described rear roof 7 comprises a roof upper panel 7a and a roof inner panel 7b which are formed integrally.

The above-described glass unit 9 comprises a front panel 9a and a rear panel 9b which are frame members. As shown in FIG. 3, the rear-window glass 8 is fixed to a rear face of the rear panel 9 by using an adhesive agent, and a unit support bracket 25 (hereafter, referred to as the bracket 25 simply) is attached to a center of a front face of the front panel 9a by using an attaching member, such as a clip. The above-described deck cover 10 is provided in back of the rear roof 7 and has an opening 10a for the glass unit 9. That is, the glass unit 9 is provided to be spaced rearward apart from a rear portion of the rear roof 7.

As shown in FIGS. 3 and 4, a rear roof support link R0 to openably support the rear roof 7 at the vehicle body is provided. This rear roof support link R0 comprises a link (longitudinal link) R1 (driving link) which extends in a vehicle longitudinal direction and a link (vertical link) R2 which extends in a vehicle vertical direction, which are integrally connected in a roughly T shape in the vehicle side view. A working gear 26 is formed integrally at a lower portion of the rear roof support link R0, and a shaft 27 (a driving-link base end shaft) which is positioned at a lower portion of the vertical link R2 is pivotally supported at a body side portion 28 of the vehicle-body side member via a bracket 29. Further, a driving gear 31 is attached to the body side portion 28 via a gear shaft 30, and the driving gear 31 engages with the working gear 26. Herein, the driving gear 31 is forwardly/reversely driven by a motor, not illustrated.

As shown in FIG. 3, the longitudinal link R1 of the rear roof support link R0 extends in the vehicle longitudinal direction from a position corresponding to the rear roof 7, and an attachment portion 32 is integrally formed at a portion of the longitudinal link R1 which corresponds to the rear roof 7. This attachment portion 32 is attached to a lower portion of the roof inner panel 7b by using an attaching member 33, such as a bolt. A front end portion of the above-described longitudinal link R1 is pivotally supported at a front portion of the bracket 24 via a pin 34.

As shown in FIGS. 3 and 4, a front-roof support link mechanism F0 to openably support the front roof 6 is provided. This front-roof support link mechanism F0 is connected to the rear roof support link R0.

As shown in FIG. 4, the above-described front-roof support link mechanism F0 comprises a first link F1 (a first control link) which extends substantially in the vertical direction, a second link F2 (a second control link) which is formed in a roughly-triangular shape, and a third link F3 (a front-roof panel control link) which extends substantially in the vehicle longitudinal direction.

As shown in FIG. 3, a lower portion of the above-described first link F1 is pivotally connected to a body side portion 28 at a position located above and behind the gear shaft 30 via a shaft 35 (base end shaft), and an upper portion of the first link F1 is pivotally connected to a lower apex of three apexes of the second link F2 via a pin 36.

A rear portion of the third link F3 is pivotally connected to a rear apex of the three apexes of the second link F2 via a pin 37, and a front portion of the third link F3 is pivotally connected to a rear portion of the bracket via a pin 38.

Further, an upper apex which is the rest of the three apexes of the second link F2 is pivotally connected to an upper portion of the vertical link R2 via a pin 39 (tip axis). The respective roof closed states (so-called fully-closed states) of the front roof 6 and the rear roof 7 are maintained by both of the rear roof support ink R0 and the front-roof support link mechanism F0 as shown in FIG. 3.

Moreover, as shown in FIGS. 3 and 4, there is provided a glass-unit support link mechanism U0 which is connected to the rear roof support link R0 and supports the glass unit 9 at a closed position (a position where the opening 10a is closed). This glass-unit support link mechanism U0 is configured to close the above-described opening 10a by the glass unit 9 when the front roof 6 and the rear roof 7 are closed as shown in FIG. 3.

As shown in FIG. 3, the above-described glass-unit support link mechanism U0 is supported at a rear portion of the longitudinal link R1 of the rear roof support link R0, in other words, at an upper-side rear portion of the rear roof support link R0 in a hanging manner.

That is, the glass-unit support link mechanism U0 comprises, as shown in FIGS. 3 and 4, a front link U1 positioned forward and a rear link U2 positioned rearward, and an upper end portion of the front link U1 is pivotally connected to a rear portion of the longitudinal link R1 via a pin 40, and a lower end portion of the front link U1 is pivotally connected right above the bracket 25 via a pin 41. Further, an upper end portion of the rear link U2 is pivotally connected to a rear portion of the longitudinal link R1 via a pin 42, and a lower end portion of the rear link U2 is pivotally connected right below the bracket 25 via a pin 43. The front link U1, the rear link U2, the pins 40-43, a portion of the longitudinal link R1, and apportion of the bracket 25 constitute a four-joint link.

The above-described front-roof support link mechanism F0 comprises the second link F2 as an intermediate rotational link, and a connecting link C1 which connects the second link F2 and the front link U1 of the glass-unit support link mechanism U0 is provided. The connecting link C1 is configured such that a component force is applied in a direction substantially perpendicular to a rotational direction of the second link F2 (in a direction which does not rotate the second link F2).

That is, a rear end portion of the connecting link C1 is pivotally connected to a central portion, in the vertical direction, of the front link U1 via a pin 44 and a front end portion of the connecting link C1 is pivotally connected to a portion of the second link F2 which is located near the pin 36 via a pin 45 such that a downward extensional line which connects the pins 44, 45 passes through the pin 36 or passes near the pin 36.

Thus, any undesired rotation of the second link F2 is suppressed by a load of the glass unit 9 which is inputted to the second link F2 by way of the glass-unit support link mechanism U0 and the connecting link C1 because of the connection structure of the connecting link C1 to the second link F2, so that the glass unit 9 is moved by using movement of the front-roof support link mechanism F0, suppressing any improper load influence from the glass unit 9.

Herein, relationships of the glass-unit support link mechanism U0 and the glass unit 9 are set as follows. That is, a gravity center of the glass unit 9 is positioned in back of the rear link U2 of the glass-unit support link mechanism U0 and the pin 41 is positioned in front of and above the pin 43 such that a stress derived from the load of the glass unit 9 acts in a direction of drawing the front link U1, thereby reducing a burden to the connecting link C1 and the second link F2 (see FIG. 3).

<Control of Rear Roof 7>

An opening/closing operation of the rear roof 7 is directly controlled by the rear roof support link R0 where the longitudinal link R1 and the vertical link R2 are formed integrally (see FIGS. 6-12).

<Control of Front Roof 6>

An opening/closing operation of the front roof 6 is controlled by a first four-joint link, which comprises the shaft 27 (the driving-link base end shaft), the pin 39 (front end axis) of the second link F2, the pin 36, and the shaft 35 (base end shaft) of the first link F1 and in which the pin 36 is positioned forward relative to a line L1 connecting the shaft 35 and the pin 39 and the respective shafts 27, 35 are fixed to the vehicle body, and a second four-joint link, which comprises the pin 34 provided at a tip of the longitudinal link R1 and the shaft 27, the pin 38 provided at a tip of the third link F3, and the pin 37 provided at a rear end of the second link F2 and in which the pin 38 is positioned above a line L2 connecting the pins 37, 34.

Figure 6:
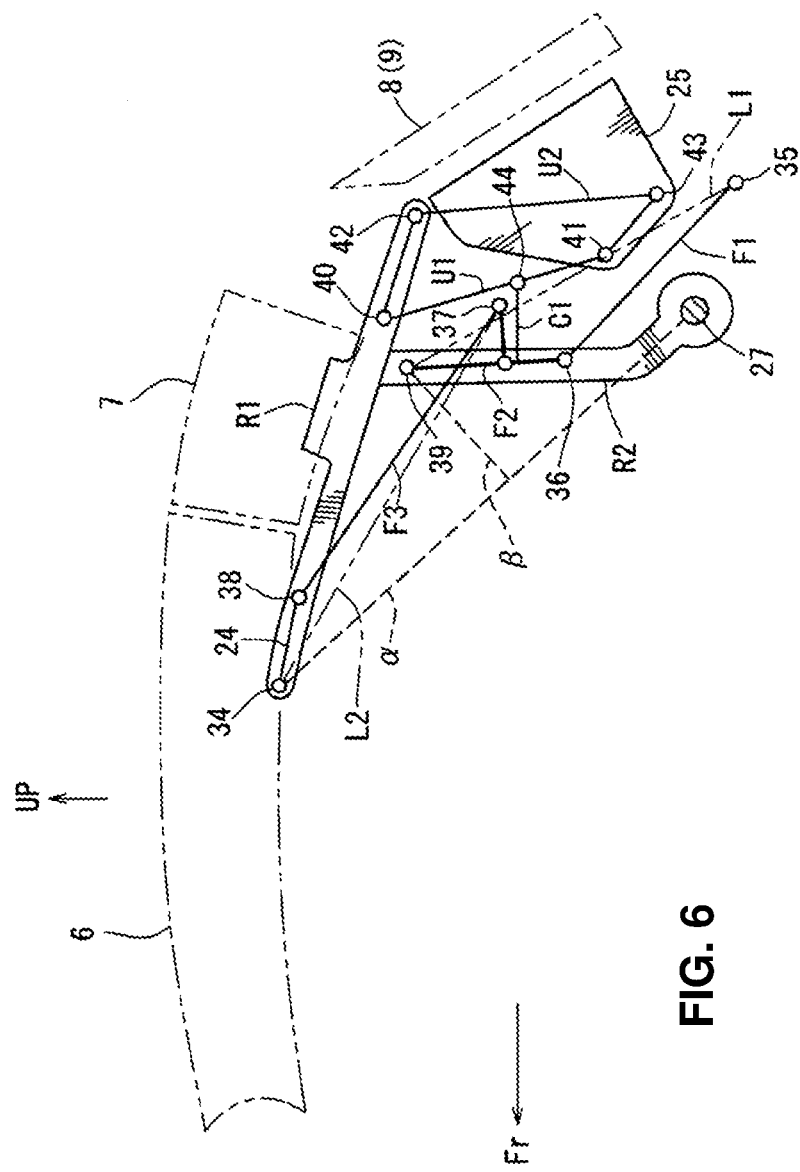
FIG. 6 is a schematic diagram schematically showing a structure in which the roof shown in FIG. 3 is fully closed.
Figure 7:
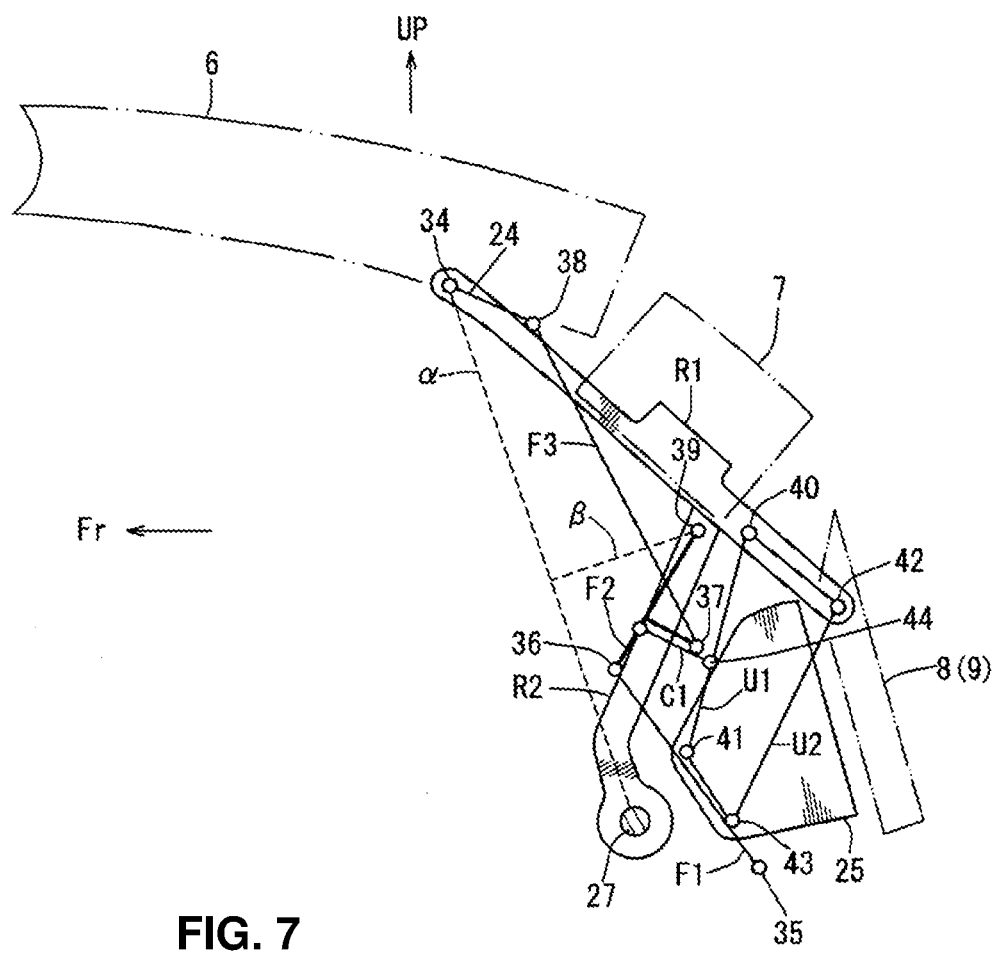
FIG. 7 is a schematic diagram of the roof structure in which the roof has a medium open position.

Specifically, when the longitudinal link R1 leans rearward for storing, the pin 39 approaches the shaft 35 and the pin 36 rotates forward relative to the pin 39 in the first four-joint link (see FIG. 7). A pin (shaft) distance is set such that as the pin 36 rotates forward, the pin 37 of the second four-joint link rotates forward relative to the pin 39, the pin 34 approaches the pin 37, and the pin 38 rotates upward relative to the pin 34. Thereby, the front roof 6 moves rearward roughly in parallel and approaches a horizontal position at its closed position (see FIG. 6) and its storing position (see FIG. 12).

<Control of Glass Unit 9>

An opening/closing operation of the glass unit 9 is controlled by the above-described first four-joint link, a third four-joint link which comprises the front link U1 and the rear link U2 (parallel link) which are supported at the rear portion of the longitudinal link R1, being spaced apart from each other, and the connecting link C1 which connects the front link U1 and the second link F2 which constitute the parallel link. Specifically, as the longitudinal link R1 leans rearward for storing, the pin 39 approaches the shaft 35 and the pin 36 moves forward in the first four-joint link (see FIG. 7).

Figure 9:
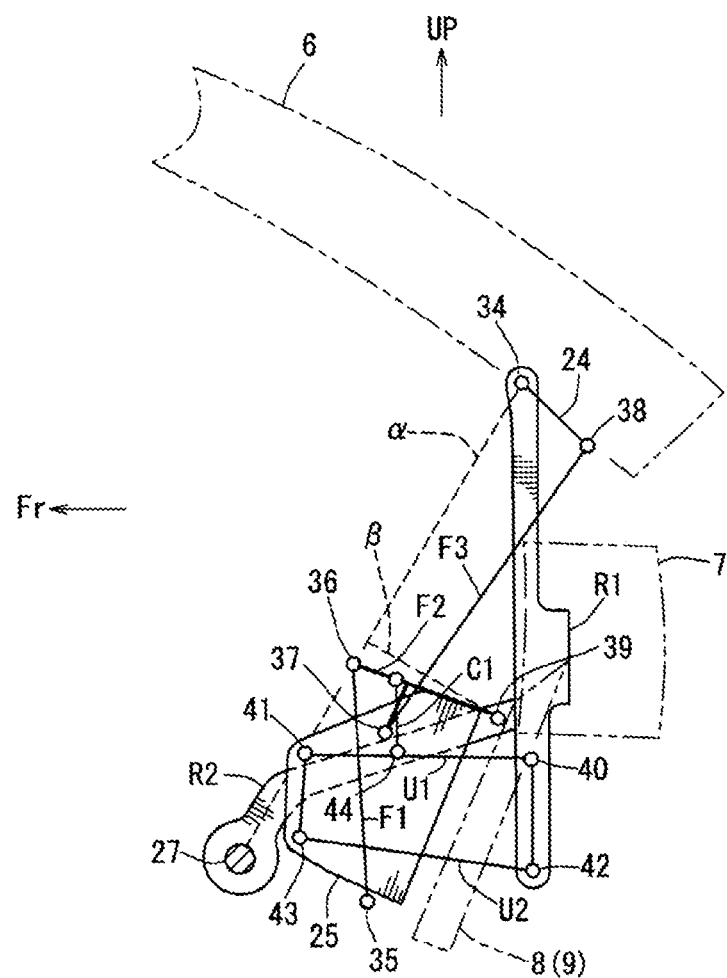
FIG. 9 is a schematic diagram of the roof structure in which the roof has the medium open position.

When the pin 36 rotates forward relative to the pin 39, the lateral link (see the links U1, U2) is drawn forward relative to the longitudinal link R1 via the connecting link C1, and the glass unit 9 is drawn slightly forward relative to the longitudinal link R1 like a swing of a pendulum and leans forward such that the rear roof 7 covers over the glass unit 9 (see FIG. 9). Then, after the forward move of the pin 45 of the connecting link C1 of the second link F2 becomes slow, the rear roof 7 and the glass unit 9 integrally swing forward from below around the shaft 27, being turned over (see FIGS. 10, 11 and 12).

The closing operation of the roof is achieved by the reverse directional driving to the opening operation. The front roof 6 is stably moved to the closed positon (see FIG. 6) by means of the first four-joint link and the second four-joint link, and the glass unit 9 is moved in accordance with the move of the front roof 6.

That is, even in the storing type of roof structure in which the glass unit 9 is provided separately from the rear roof 7 and configured to be unstable until the glass unit 9 has fully closed the opening 10a, the present structure is configured such that any influence of disturbance, such as swinging of the glass unit 9, on the positioning accuracy for the front roof 6 is suppressed.

Figure 5:
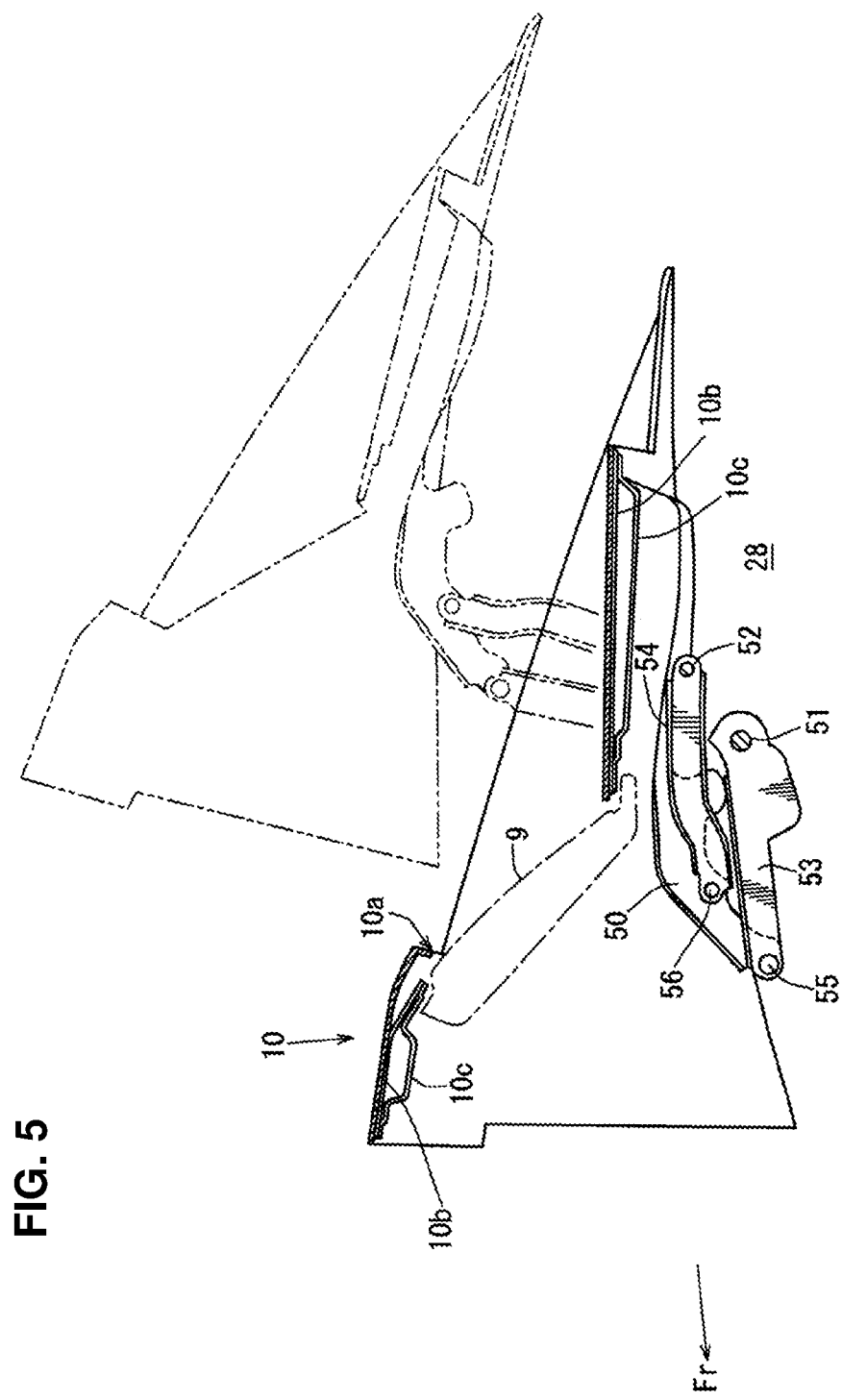
FIG. 5 is a side view showing a support structure of a deck cover.

FIG. 5 is a side view showing a support structure of the deck cover 10, when viewed from an inward side of the vehicle. As shown in FIG. 5, the deck cover 10 comprises an upper panel 10b and a lower panel 10c which form together a frame structure, and includes the opening 10a for the glass unit 9 as described above. Further, the deck cover 10 has a deck-cover support bracket 50 (hereafter, referred to as the bracket 50 simply) at its lower portion.

Further, two base end shafts 51, 52 are provided at the body side portion 28, being spaced apart from each other in the vehicle longitudinal direction, and links 53, 54 which constitute a parallel link are respectively attached to the base end shafts 51, 52.

A front end portion of the link 53 which is a driving side is pivotally connected right below the bracket 50 via a pin 55, and a front end portion of the link 54 which is a driven side is pivotally connected to a lower portion of the center, in the longitudinal direction, of the bracket 50 via a pin 56. The above-described base end shaft 51 is forwardly/reversely driven by a special drive motor for the deck cover 10 which is different from the roof-side drive motor.

When the drive motor rotates forwardly, the respective links 53, 54 of the parallel link rotates in a rising direction (a clockwise direction in FIG. 5) so as to elevate the deck cover 10 upward and rearward as shown by an imaginary line in FIG. 5 via the bracket 50, so that the deck cover 10 is opened to a non-interference position where the deck cover 10 has no interference with the front roof 6 or the rear roof 7 while the roofs 6, 7 are opened or closed.

Figure 8:
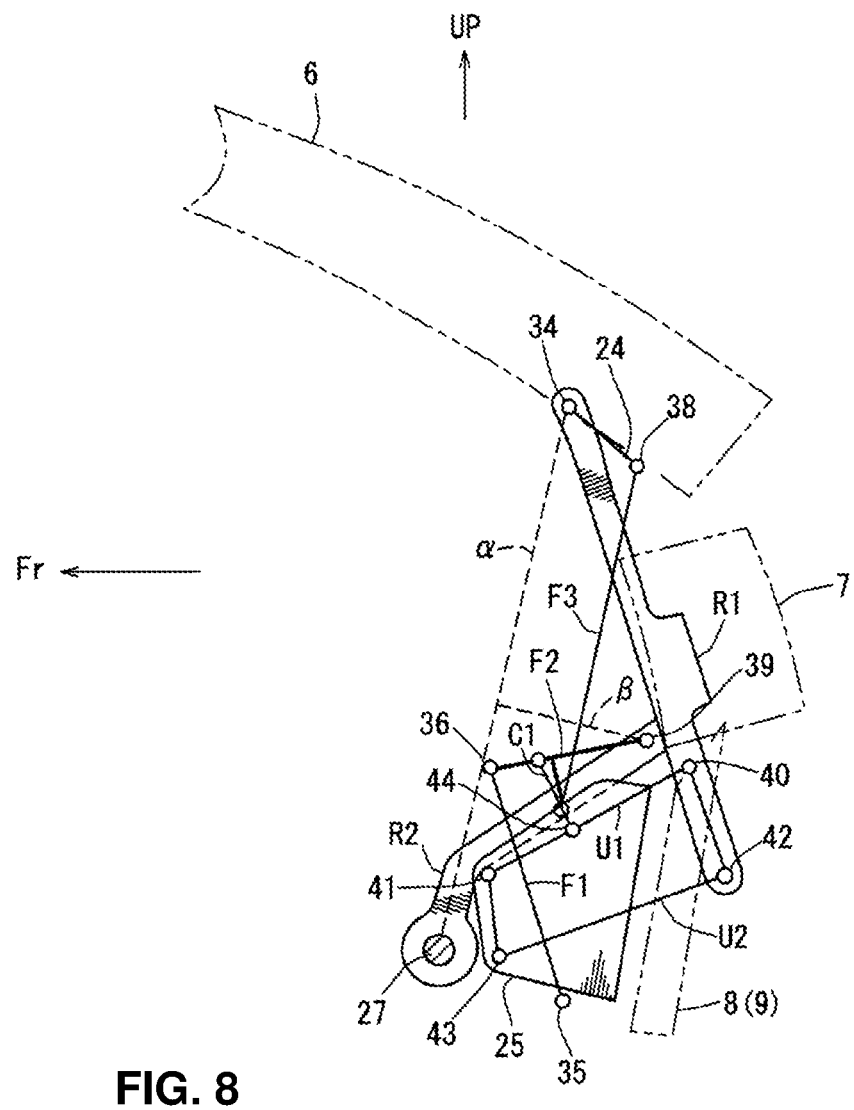
FIG. 8 is a schematic diagram of the roof structure in which the roof has the medium open position.
Figure 10:
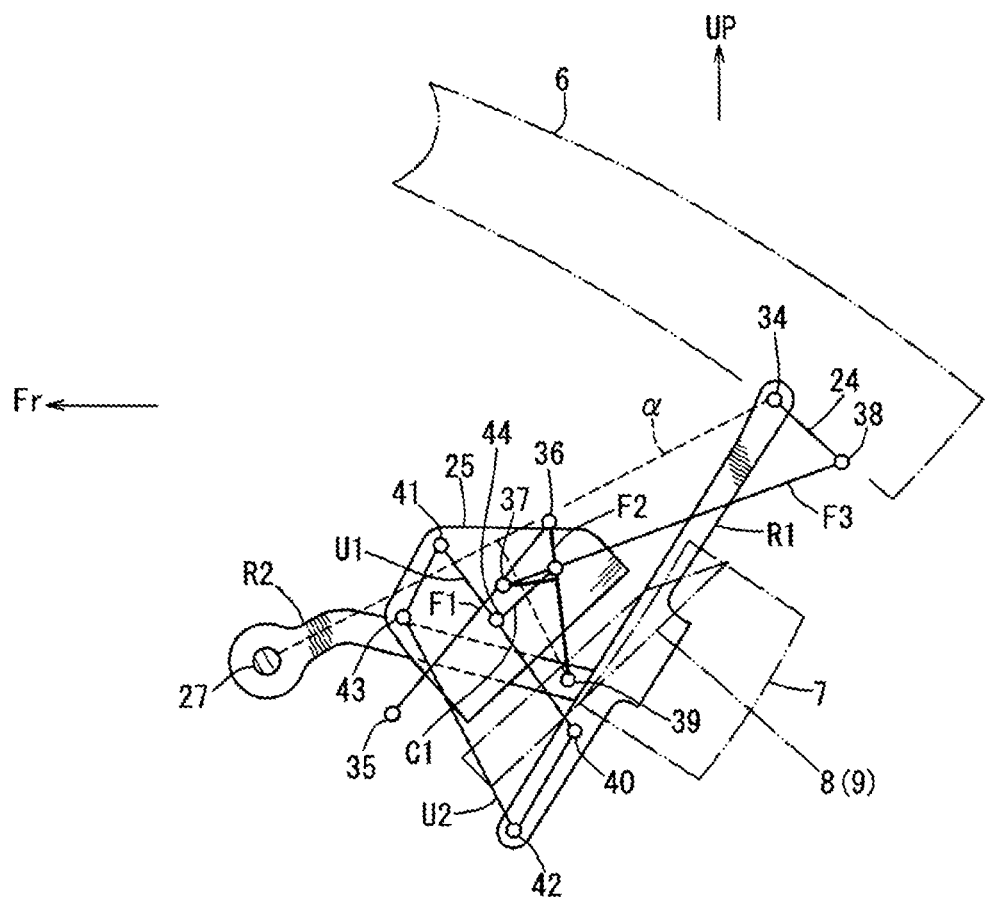
FIG. 10 is a schematic diagram of the roof structure in which the roof has the medium open position.
Figure 11:
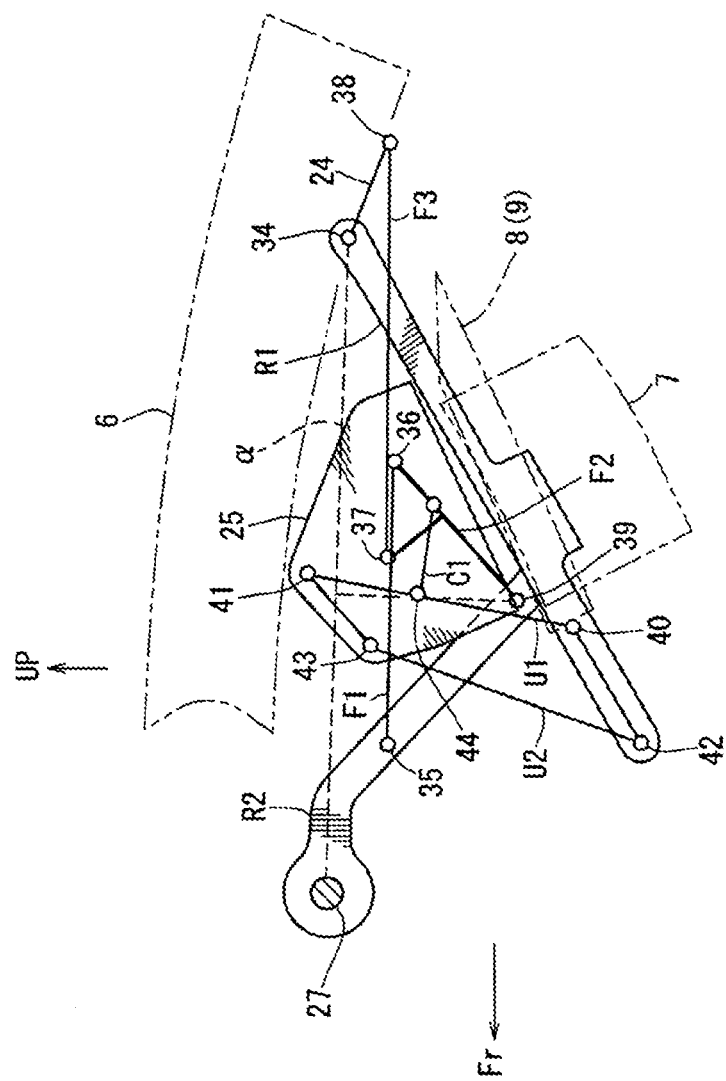
FIG. 11 is a schematic diagram of the roof structure in which the roof has a position right before the roof has been stored.
Figure 12:
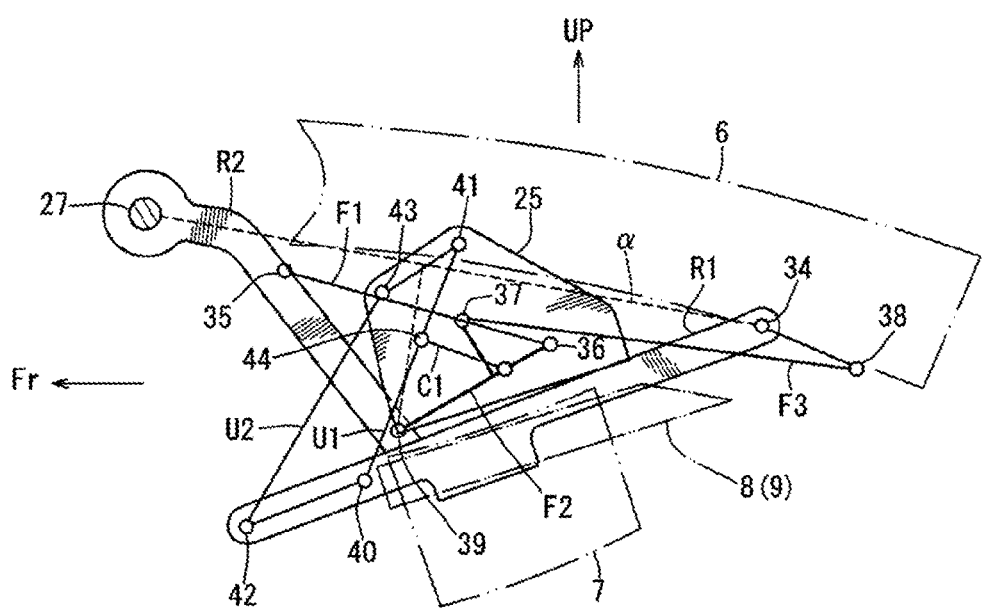
FIG. 12 is a schematic diagram of the roof structure in which the roof has a position when the roof has been stored.

FIGS. 6-12 are schematic diagrams schematically showing the roof's positions from the fully-closed position to the fully-opened position in order. FIG. 6 is the schematic diagram schematically showing a structure in which the roof shown in FIG. 3 is fully closed, FIG. 7 is the schematic diagram of the roof structure in which the roof has a medium open position, FIG. 8 is the schematic diagram of the roof structure in which the roof has the medium open position (a roof open angle of 50 degrees), FIG. 9 is the schematic diagram of the roof structure in which the roof has the medium open position (the roof open angle of 70 degrees), FIG. 10 is the schematic diagram of the roof structure in which the roof has the medium open position (the roof open angle of 100 degrees), FIG. 11 is the schematic diagram of the roof structure in which the roof has a position right before the roof has been stored (the roof open angle of 130 degrees), and FIG. 12 is the schematic diagram of the roof structure in which the roof has a position when the roof has been stored (the roof open angle of 137 degrees). The above-described numbers (magnitudes) of the roof open angle are merely examples and the roof open angle is not to be limited to these numbers (magnitudes). Herein, in FIGS. 6-12, a line which connects the shaft 27 and the pin 34 is shown by a broken line a, and a line which perpendicularly connects the pin 39 and the broken lien a is shown by a broken line 13.

In a case where the front roof 6, the rear roof 7, first, the glass unit 9, and the deck cover 10 which are positioned at the roof fully-closed state shown in FIGS. 3 and 6 are stored in the roof fully-open state (complete storing state) shown in FIG. 12, the deck cover 10 is elevated to the non-interference position illustrated by the imaginary line in FIG. 5 where the deck cover 10 has no interference with the roofs 6, 7 by means of the links 53, 54 as show in FIG. 5.

Next, when the rear roof support link R0 is made to lean rearward from the state shown in FIGS. 3 and 6, the pin 39 approaches the shaft 35 as described above, the distance between the both 39, 35 is shortened, the pin 37 rotates around the pin 39, and the third link F3 is pushed upward. Thereby, the front roof 6 is moved rearward, suppressing its rearward leaning compared with the rear roof support link R0 (see FIG. 7).

When the rear roof support link R0 is rotated further rearward, the front roof 6, the rear roof 7, and the glass unit 9 are all stored into the roof storing portion 11 shown in FIG. 1, passing through the states shown in FIGS. 8-11 from the state shown in FIG. 7. In this case, the rear roof 7 and the glass unit 9 are turned over from the roof fully-closed state (see FIG. 6), but the front roof 6 is not turned over and covers over the rear roof 7 and the glass unit 9 which have been stored. In the figures, an arrow Fr shows the vehicle forward side, an arrow Re shows the vehicle rearward side, and an arrow UP shows the vehicle upward side.

The roof structure of the automotive vehicle of the above-described embodiment comprises the front roof 6, the rear roof 7, the glass unit 9 including the rear-window glass 8, the rear roof support link R0 openably supporting the rear roof 7 at the vehicle body, the front-roof support link mechanism F0 openably supporting the front roof 6, the front-roof support link mechanism F0 being connected to the rear roof support link R0 such that the closed states of both the front roof 7 and the rear roof 7 are achieved by means of the rear roof support link R0 and the front-roof support link mechanism F0, and the glass-unit support link mechanism U0 connected to the rear roof support link R0 and configured to support the glass unit 9 in the closed position (see FIG. 3).

According to the present structure, since the closed states of the front roof 6 and the rear roof 7 are achieved by means of the rear roof support link R0 and the front-roof support link mechanism F0 in the structure in which the roofs are opened or closed by concurrently moving the three members of the front roof 6, the rear roof 7, and the glass unit 9, the respective closed states of the front roof 6 and the rear roof 7 can be stabilized and also the three members of the front roof 6, the rear roof 7, and the glass unit 9 can be moved integrally by means of the rear roof support link R0, the front-roof support link mechanism F0 and the glass-unit support link mechanism U0. Further, since the position of the front roof 6 can be controlled, the opening/closing of the front roof 6 can be operated compactly by maintaining its positon horizontal or by keeping its position which can reduce the wind resistance properly.

Further, in the embodiment of the present invention, the deck cover 10 configured to openably cover part of the upward side of the cabin 5 and having the opening 10a for the glass unit 9 is further provided in back of the rear roof 7, being spaced apart from the rear roof 7, the deck cover 10 being openable to the non-interference position where the deck cover 10 has no interference with the front roof 6 or the rear roof 7 while the front roof 6 or the rear roof 7 are opened or closed, and the glass-unit support link mechanism U0 is configured to close the opening 10a formed at the deck cover 10 by the glass unit 9 when the front roof 6 and the rear roof 7 are closed and the deck cover 10 covers the part of the cabin 5 (see FIGS. 3 and 5).

According to this structure, while the glass unit 9 may be unstable at a moment right before the front roof 6 and the rear roof 7 have been closed because the glass unit 9 is spaced rearward apart from the rear portion of the rear roof 7, the above-described opening 10a is closed by the glass unit 9 when the front roof 6 and the rear roof 7 are closed, thereby providing the properly-stable state. Accordingly, this structure becomes effective, in particular, in a case where it is necessary that the front roof 6 is moved forward to a position where the front roof 6 is completely closed when the hook 21 provided at the front end of the front roof 6 engages with the latch 12 provided at the vehicle-body side (see the front header 2 shown in FIG. 2) or the like, for example.

In the embodiment of the present invention, the front-roof support link mechanism F0 comprises the intermediate rotational link (see the second link F2), and the connecting link C1 which connects the intermediate rotational link (the second link F2) and the glass-unit support link mechanism U0 is provided, the connecting link C1 being configured such that a component force is applied in a direction substantially perpendicular to the rotational direction of the intermediate rotational link (the second link F2) (see FIG. 3).

According to this structure, since any undesired rotation of the intermediate rotational link (the second link F2) is suppressed by a load of the glass unit 9 which is inputted to the intermediate rotational link (the second link F2) by way of the glass-unit support link mechanism U0 and the connecting link C1 because of the connection structure of the connecting link C1 to the intermediate rotational link (the second link F2), the glass unit 9 can be moved by using movement of the front-roof support link mechanism F0, suppressing any improper load influence from the glass unit 9. Further, the position adjustment between the roofs can be easily conducted, and the positional accuracy and the sealing performance can be improved.

In the embodiment of the present invention, the glass-unit support link mechanism U0 is supported at the upper-side rear portion of the rear roof support link R0 in the hanging manner (see FIG. 3).

According to this structure, the load influence of the glass unit 9 on the front-roof support link mechanism F0 is so reduced that the opening/closing movement of the front roof 6 can be stabilized.

In correspondence of the present invention to the above-described embodiment, the intermediate rotational link of the present invention corresponds to the second link F2 of the embodiment. However, the present invention should not be limited to the above-described embodiment, and any other modifications or improvements may be applied within the scope of a spirit of the present invention. For example, while the longitudinal link R1 and the vertical link R2 are combined integrally to constitute the rear roof support link R0 for yield improvement in blanking in the above-described embodiment, the rear roof support link R0 may be made of a single sheet of material.

What is claimed is:

1. A roof structure of an automotive vehicle, comprising:
a front roof, a rear roof, and a glass unit including a rear-window glass which are configured to openably cover part of an upward side of a cabin, respectively;
a rear roof support link openably supporting the rear roof at a vehicle body;
a front-roof support link mechanism openably supporting the front roof, the front-roof support link mechanism being connected to the rear roof support link such that closed states of both the front roof and the rear roof are achieved by means of the rear roof support link and the front-roof support link mechanism; and
a glass-unit support link mechanism connected to the rear roof support link and configured to support the glass unit in a closed position, wherein said glass-unit support link mechanism is supported at an upper-side rear portion of said rear roof support link in a hanging manner, wherein
said front-roof support link mechanism comprises an intermediate rotational link,
said intermediate rotational link and said glass-unit support link mechanism are connected by a connecting link, and
the intermediate rotational link comprises at least three pins.

2. The roof structure of the automotive vehicle of claim 1, wherein
the connecting link is configured such that a component force is applied in a direction substantially perpendicular to a rotational direction of said intermediate rotational link.

3. The roof structure of the automotive vehicle of claim 1, wherein
the intermediate rotational link is formed in a roughly-triangular shape.

* * * * *